United States Patent
Okubo et al.

(10) Patent No.: US 10,391,998 B2
(45) Date of Patent: Aug. 27, 2019

(54) VEHICLE SYSTEMS AND METHODS FOR REDUCING ELECTRIFIED VEHICLE NOISE, VIBRATION, AND HARSHNESS

(71) Applicant: FORD GLOBAL TECHNOLOGIES, LLC, Dearborn, MI (US)

(72) Inventors: Shunsuke Okubo, Belleville, MI (US); Kent Hancock, Ann Arbor, MI (US); Thomas Francis Rolewicz, Berkley, MI (US); Justin Reuel Badger, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 482 days.

(21) Appl. No.: 15/352,859

(22) Filed: Nov. 16, 2016

(65) Prior Publication Data

US 2018/0134271 A1    May 17, 2018

(51) Int. Cl.
| | | |
|---|---|---|
| *B60W 20/00* | (2016.01) | |
| *B60Q 1/44* | (2006.01) | |
| *B60K 6/22* | (2007.10) | |
| *F16H 63/40* | (2006.01) | |
| *F16H 63/34* | (2006.01) | |

(52) U.S. Cl.
CPC ............... *B60W 20/00* (2013.01); *B60K 6/22* (2013.01); *B60Q 1/44* (2013.01); *F16H 63/40* (2013.01); *B60W 2510/1005* (2013.01); *B60W 2710/188* (2013.01); *B60W 2710/30* (2013.01); *B60Y 2200/92* (2013.01); *B60Y 2300/89* (2013.01); *F16H 63/3416* (2013.01); *Y10S 903/904* (2013.01); *Y10S 903/947* (2013.01)

(58) Field of Classification Search
CPC ............. F02N 15/003; F02N 2200/102; F02N 2200/0803; G05D 3/00; G05D 3/128; G05D 13/28; B60T 2201/00; B60T 2201/02; B60T 2201/10; B60T 2201/12; B60T 2260/00; B60T 2270/89; B60T 7/10; B60T 7/12; B60Q 11/007; B60Q 2300/05; B60Q 2300/116; B60Q 2400/00; B60W 2510/18; B60W 2510/186; B60W 2510/069; B60W 30/18109; B60W 2710/18; B60W 2710/186; B60W 10/18; B60W 10/182; B60W 10/184; B60W 10/188; B60W 10/192

USPC ......... 340/932.2, 463, 464, 468, 479, 815.4; 701/48, 70

See application file for complete search history.

(56) References Cited

U.S. PATENT DOCUMENTS

| | | | |
|---|---|---|---|
| 6,384,490 B1 | 5/2002 | Birzl et al. | |
| 8,645,037 B2 | 2/2014 | Kato et al. | |
| 2013/0098032 A1 | 4/2013 | Wade et al. | |
| 2013/0151048 A1 | 6/2013 | Kwon et al. | |
| 2013/0225363 A1* | 8/2013 | Lehmen ............... | B60W 10/06 477/4 |

(Continued)

FOREIGN PATENT DOCUMENTS

GB          2413999 B        8/2008

*Primary Examiner* — Anthony R Jimenez
(74) *Attorney, Agent, or Firm* — Carlson, Gaskey & Olds

(57) ABSTRACT

A method includes controlling an electrified vehicle by automatically engaging a braking device if the electrified vehicle is in park and an engine start or stop request has been received. Controlling the electrified vehicle includes preventing a brake lamp from illuminating during engagement of the braking device.

16 Claims, 3 Drawing Sheets

(56) References Cited

U.S. PATENT DOCUMENTS

2014/0100076 A1\* 4/2014 Bowman ............... B60W 20/00
477/5

\* cited by examiner

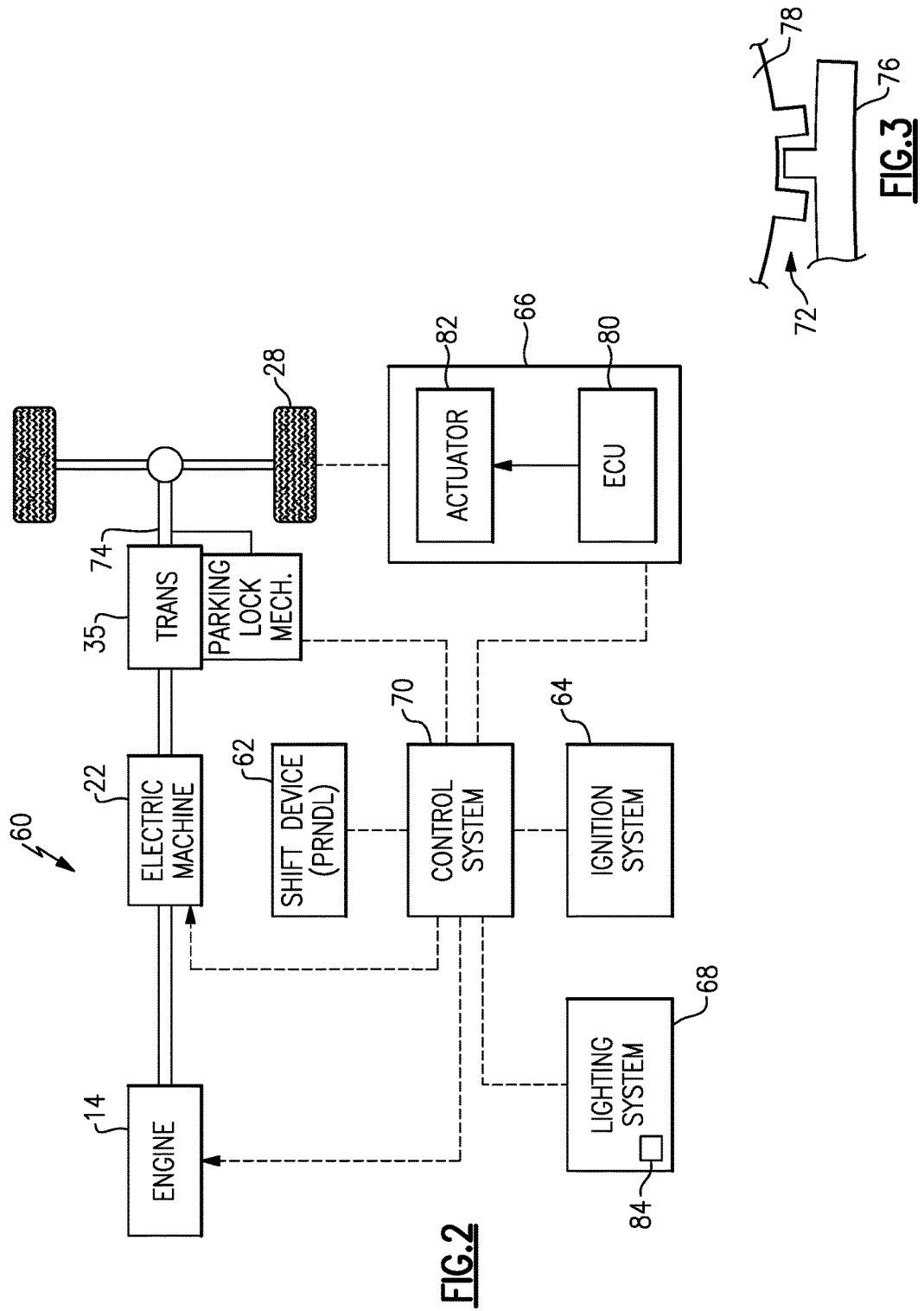

VEHICLE SYSTEMS AND METHODS FOR REDUCING ELECTRIFIED VEHICLE NOISE, VIBRATION, AND HARSHNESS

TECHNICAL FIELD

This disclosure relates to electrified vehicles. An exemplary method of controlling an electrified vehicle includes automatically engaging a braking device if the electrified vehicle is in park and an engine start or stop request has been received.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

Some electrified vehicles, such as hybrid electric vehicles (HEV's), are equipped with both an engine and an electric machine. Starting the engine of an HEV while in park can produce noise, vibration, and harshness. This may be undesirable to the vehicle operator.

SUMMARY

A method according to an exemplary aspect of the present disclose includes, among other things, controlling an electrified vehicle by automatically engaging a braking device if the electrified vehicle is in park and an engine start or stop request has been received. Controlling the electrified vehicle includes preventing a brake lamp from illuminating during engagement of the braking device.

In a further non-limiting embodiment of the foregoing method, the method includes starting an engine of the electrified vehicle after engaging the braking device.

In a further non-limiting embodiment of either of the foregoing methods, the method includes disengaging the braking device after the engine is started.

In a further non-limiting embodiment of any of the foregoing methods, the method includes stopping the engine of the electrified vehicle after engaging the braking device.

In a further non-limiting embodiment of any of the foregoing methods, the method includes disengaging the braking device after the engine is stopped.

In a further non-limiting embodiment of any of the foregoing methods, the braking device is an electronic braking device.

In a further non-limiting embodiment of any of the foregoing methods, a shift device indicates if the electrified vehicle is in park.

In a further non-limiting embodiment of any of the foregoing methods, the method includes determining whether the engine start or stop request has been received prior to engaging the braking device.

In a further non-limiting embodiment of any of the foregoing methods, the method includes communicating a brake apply request signal to the braking device prior to engaging the braking device.

In a further non-limiting embodiment of any of the foregoing methods, engaging the braking device substantially locks a vehicle wheel to avoid unintended vehicle movement and reduce unwanted noise, vibration, and harshness during the engine start or stop request.

An electrified vehicle according to another exemplary aspect of the present disclosure includes, among other things, an engine, a vehicle wheel driven by the engine, a braking device for braking the vehicle wheel, a brake lamp selectively illuminated if the braking device is applied, and a control system configured with instructions for automatically actuating the braking device and preventing the brake lamp from illuminating if the electrified vehicle is in park and an engine start or stop request has been received.

In a further non-limiting embodiment of the foregoing electrified vehicle, a shift device indicates whether the electrified vehicle is in park.

In a further non-limiting embodiment of either of the foregoing electrified vehicles, a parking lock mechanism is configured to lock an output shaft of a transmission.

In a further non-limiting embodiment of any of the foregoing electrified vehicles, the control system is configured with instructions for disengaging the braking device after the engine is started.

In a further non-limiting embodiment of any of the foregoing electrified vehicles, the control system is configured with instructions for disengaging the braking device after the engine is stopped.

In a further non-limiting embodiment of any of the foregoing electrified vehicles, the braking device includes an electronic control unit and an actuator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates a vehicle system of an electrified vehicle.

FIG. 3 illustrates portions of a parking lock mechanism of the vehicle system of FIG. 2.

DETAILED DESCRIPTION

This disclosure details vehicle systems and methods for controlling electrified vehicles in a manner that reduces the amount of noise, vibration, and harshness perceived by the electrified vehicle driver/operator. An exemplary method includes controlling an electrified vehicle by automatically engaging a braking device if the electrified vehicle is in park and an engine start or stop request has been received. These and other features are discussed in greater detail in the following paragraphs of this detailed description.

Figure 1:
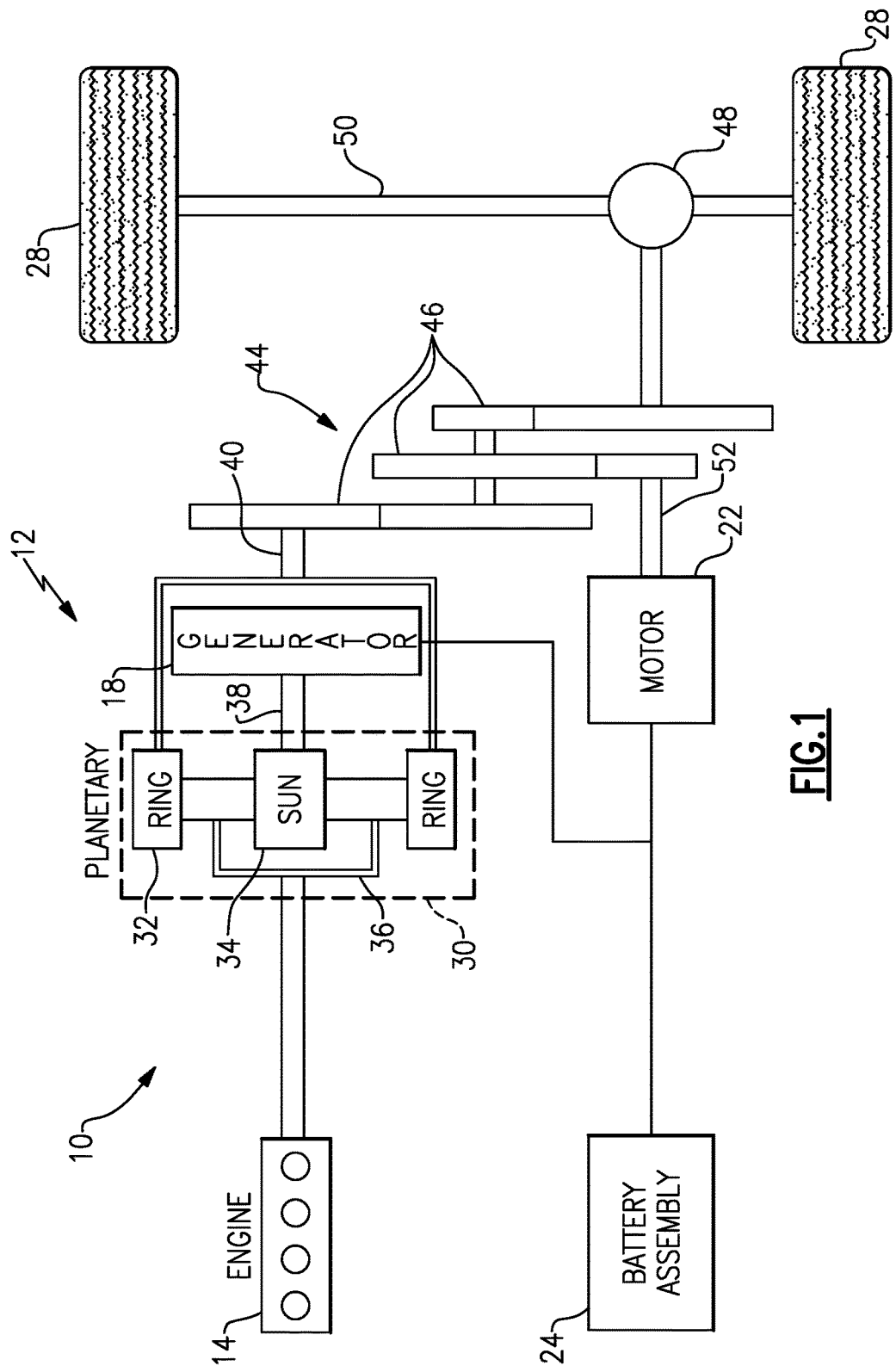
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other types of electrified vehicles, including, but not limited to, plug-in hybrid electric vehicles (PHEV's).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle wheels 28. The differential 48 may include a plurality of gears that enable the transfer of torque to the vehicle wheels 28. In one embodiment, the second power transfer unit 44 is mechanically coupled to an axle 50 through the differential 48 to distribute torque to the vehicle wheels 28.

The motor 22 can also be employed to drive the vehicle wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

FIG. 2 schematically illustrates a vehicle system 60 that may be incorporated into an electrified vehicle, such as the electrified vehicle 12 of FIG. 1. The vehicle system 60 may be employed to reducing unwanted noise, vibration, and harshness that can occur during electrified vehicle operation. For example, undesirable noise, vibration, and harshness can occur when starting the engine 14 while the electrified vehicle is in park (i.e., a non-drive gear). The vehicle system 60 is designed to address these undesirable side effects. In a non-limiting embodiment, the vehicle system 60 includes an engine 14, an electric machine 22, a transmission 35, a shift device 62, an ignition system 64, a braking device 66, a lighting system 68, and a control system 70. It should be understood; however, that the vehicle system 60 could be made up of fewer or additional components.

The shift device 62 is located within a passenger compartment of the electrified vehicle and is generally used to change a gear of the transmission 35. For example, the shift device 62 may be used to shift the transmission 35 into park (P), reverse (R), neutral (N), drive (D), low (L), etc. In a first non-limiting embodiment, the shift device 62 is a shift lever movable to change the gear. In a second non-limiting embodiment, the shift device 62 is an electronic shift device that includes one or more joysticks, dials and/or buttons for changing the gear.

When the shift device 62 is positioned in park, a parking lock mechanism 72 of the transmission 35 is engaged to substantially lock an output shaft 74 of the transmission 35. When engaged, a pawl 76 of the parking lock mechanism 72 is moved into meshing engagement with a notched wheel 78 of the parking lock mechanism 72 to lock the output shaft 74 (see, for example, FIG. 3).

The ignition system 64 is selectively employed to start the electrified vehicle. In a non-limiting embodiment, the ignition system 64 is controlled by a key operated ignition switch. In an alternative non-limiting embodiment, the ignition system 64 includes a push-button ignition switch equipped to start the vehicle when a valid key or fob is located inside or near the electrified vehicle. In some embodiments, an engine start request is associated with actuation of the ignition system 64.

The braking device 66 can be selectively actuated to brake the electrified vehicle by locking the vehicle wheels 28. The braking device 66 could include friction brakes, a parking brake, or any other braking device. In a non-limiting embodiment, the braking device 66 is an electronic braking device that includes an electronic control unit (ECU) 80 and an actuator 82. During certain operating conditions, such as when the vehicle is in park and an engine start or stop request has been received, the ECU 80 may command the actuator 82 to engage the braking device 66 and thereby prevent one or more vehicle wheels 28 from moving.

The lighting system 68 may include a multitude of lighting and signaling devices located throughout the vehicle for illuminating the vehicle and alerting other drivers and/or pedestrians to the vehicle's presence and to the driving intentions of the vehicle. Among various other lighting and signaling devices, the lighting system 68 includes one or more brake lamps 84 that can be illuminated when the braking device 66 has been applied.

The control system 70 is programmed with instructions for controlling the vehicle system 60 and its various components. In particular, the control system 70 may control operation of the vehicle system 60, and thus the electrified vehicle, in a manner that reduces undesirable noise, vibration, and harshness. The control system 70 may be a part of, or communicate with, a vehicle system controller of the electrified vehicle, or any other controller. In a non-limiting embodiment, the control system 70 is part of a hybrid powertrain control module (HPCM).

The control system 70 may include one or more control modules equipped with executable instructions for interfacing with and commanding operation of various components of the vehicle system 60. Each such control module may include a processing unit and non-transitory memory for executing the various control strategies and modes of the vehicle system 60.

In a further non-limiting embodiment, the control system 70 communicates/receives control signals to/from each of the engine 14, the electric machine 22, the parking lock mechanism 72, the shift device 62, the ignition system 64, the braking device 66, and the lighting system 68 for controlling operation of the electrified vehicle. The control system 70 may communicate with these components over a controller area network (CAN), in a non-limiting embodiment.

In a non-limiting embodiment, the control system 70 is configured to command engagement of the braking device 66 if the shift device 62 is positioned in park and an engine start or stop request has been received. Engagement of the braking device 66 substantially locks the vehicle wheels 28 to avoid unintended vehicle movement during the engine start. This act reduces unwanted noise, vibration, and harshness during the engine start or stop.

Figure 4:
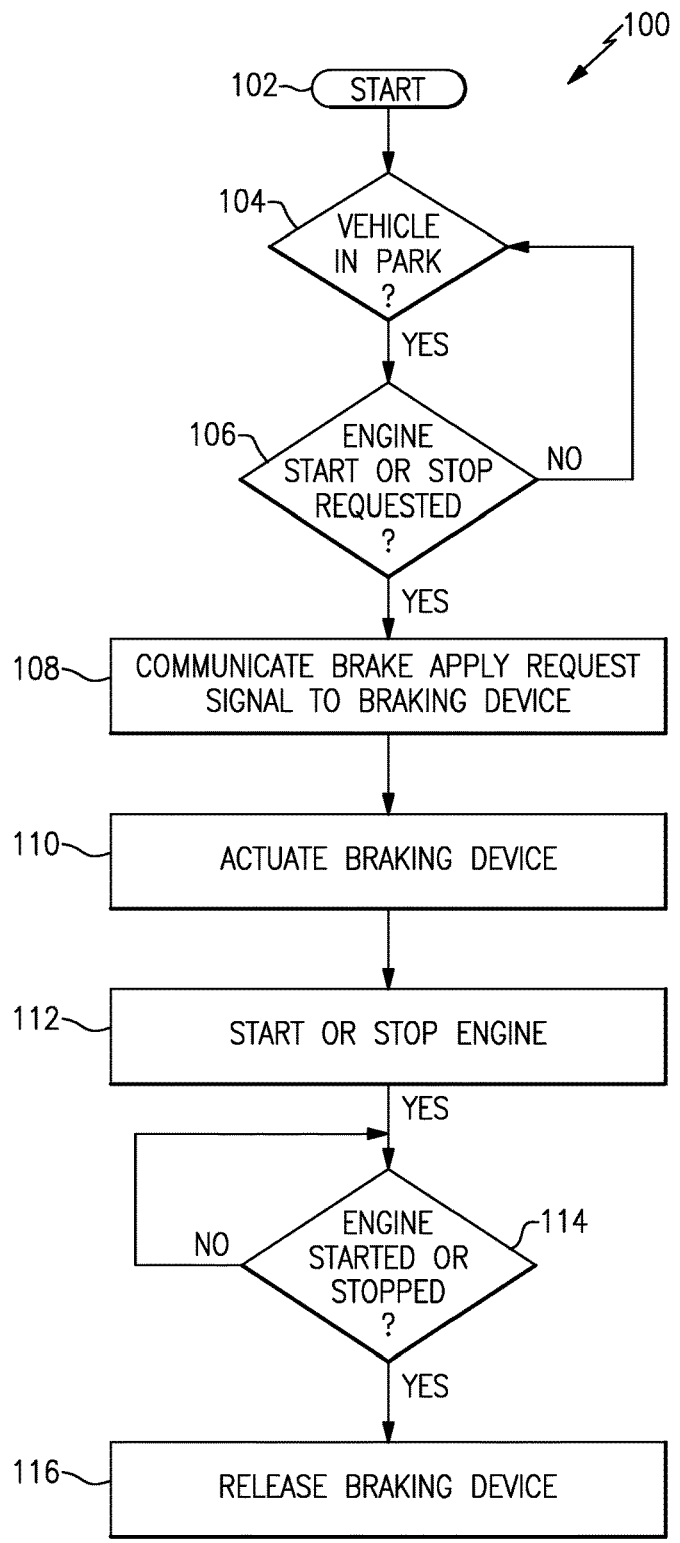
FIG. 4 schematically illustrates a vehicle control strategy for controlling an electrified vehicle in a manner that reduces noise, vibration, and harshness.

FIG. 4, with continued reference to FIGS. 1-3, schematically illustrates a vehicle control strategy 100 for controlling an electrified vehicle in a manner that reduces the amount of noise, vibration, and harshness perceived by a driver. In a non-limiting embodiment, the control system 70 may be programmed with one or more algorithms adapted to execute the vehicle control strategy 100, or any other control strategy.

The exemplary vehicle control strategy 100 begins at block 102. At block 104, the control strategy 100 determines whether or not the electrified vehicle is in park. For example, the control system 70 may monitor the status of the shift device 62 to determine whether it is currently positioned in the park position. The shift device 62 may include one or more sensors for communicating shift position signals to the control system, in a non-limiting embodiment.

If the shift device 62 is determined to be positioned in park, the control strategy 100 proceeds to block 106. At this step, the control strategy 100 determines whether an engine start (or stop) has been requested. A variety of factors may be utilized to determine whether an engine start or stop has been requested including but not limited to state of charge or discharge limits, climate control requests, CHT based thresholds, and catalyst temperature maintenance.

If blocks 104 and 106 both return "YES" flags, the control strategy 100 proceeds to block 108 and communicates a brake apply request signal to the braking device 66. In a non-limiting embodiment, for example, the control system 70 communicates the brake apply request signal to the ECU 80 of the braking device 66. The ECU 80 may then execute a brake apply request routine to determine whether the brake apply request signal is a valid request. If yes, ECU 80 commands the actuator 82 to actuate the braking device 66 and thus lock the vehicle wheels 28 at block 110.

In another non-limiting embodiment, the brake lamps 84 of the lighting system 68 are prevented from being illuminated during the engagement of the braking device 66. The control system 70 may communicate with the lighting system 68 during the control strategy 100 to prevent illumination of the brake lamps 84.

The engine 14 is started at block 112. Noise, vibration, and harshness are limited during the engine start (or stop) because the vehicle wheels 28 have already been locked by the braking device 66. After confirming that the engine 14 has started at block 114, the control strategy 100 proceeds to block 116 by releasing or disengaging the braking device 66.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling an electrified vehicle by automatically engaging a braking device when the electrified vehicle is in park and an engine start or stop request has been received, wherein controlling the electrified vehicle includes preventing a brake lamp from illuminating during engagement of the braking device.

2. The method as recited in claim 1, wherein the braking device is an electronic braking device.

3. The method as recited in claim 1, comprising starting an engine of the electrified vehicle after engaging the braking device.

4. The method as recited in claim 3, comprising disengaging the braking device after the engine is started.

5. The method as recited in claim 1, comprising stopping the engine of the electrified vehicle after engaging the braking device.

6. The method as recited in claim 5, comprising disengaging the braking device after the engine is stopped.

7. The method as recited in claim 1, wherein a shift device indicates when the electrified vehicle is in park.

8. The method as recited in claim 1, comprising determining whether the engine start or stop request has been received prior to engaging the braking device.

9. The method as recited in claim 1, comprising communicating a brake apply request signal to the braking device prior to engaging the braking device.

10. The method as recited in claim 1, wherein engaging the braking device substantially locks a vehicle wheel to avoid unintended vehicle movement and reduce unwanted noise, vibration, and harshness during the engine start or stop request.

11. An electrified vehicle, comprising:
 an engine;
 a vehicle wheel driven by the engine;
 a braking device for braking the vehicle wheel;
 a brake lamp selectively illuminated when the braking device is applied; and
 a control system configured with instructions for automatically actuating the braking device and preventing the brake lamp from illuminating when the electrified vehicle is in park and an engine start or stop request has been received.

12. The electrified vehicle as recited in claim 11, comprising a shift device that indicates whether the electrified vehicle is in park.

13. The electrified vehicle as recited in claim 11, comprising a parking lock mechanism configured to lock an output shaft of a transmission.

14. The electrified vehicle as recited in claim 11, wherein the control system is configured with instructions for disengaging the braking device after the engine is started.

15. The electrified vehicle as recited in claim 11, wherein the control system is configured with instructions for disengaging the braking device after the engine is stopped.

16. The electrified vehicle as recited in claim 11, wherein the braking device includes an electronic control unit and an actuator.

* * * * *